United States Patent
Deville et al.

(10) Patent No.: US 10,802,137 B2
(45) Date of Patent: Oct. 13, 2020

(54) METHOD FOR COMPENSATION OF THE EFFECT OF ANTENNA OFF-POINTING IN AN SAR IMAGE AND RADAR IMPLEMENTING SUCH A METHOD

(71) Applicant: THALES, Courbevoie (FR)

(72) Inventors: Aymeric Deville, Merignac (FR); Alexandre Quinquis, Merignac (FR); Rodolphe Cottron, Merignac (FR)

(73) Assignee: THALES, Courbevoie (FR)

( * ) Notice: Subject to any disclaimer, the term of this patent is extended or adjusted under 35 U.S.C. 154(b) by 171 days.

(21) Appl. No.: 16/125,728

(22) Filed: Sep. 9, 2018

(65) Prior Publication Data
US 2019/0079178 A1   Mar. 14, 2019

(30) Foreign Application Priority Data
Sep. 14, 2017   (FR) ...................................... 17 00930

(51) Int. Cl.
*G01S 13/90* (2006.01)
*G01S 7/40* (2006.01)
*G01S 13/00* (2006.01)

(52) U.S. Cl.
CPC .............. *G01S 13/904* (2019.05); *G01S 7/40* (2013.01); *G01S 7/4026* (2013.01); *G01S 13/90* (2013.01); *G01S 2007/403* (2013.01)

(58) Field of Classification Search
CPC .................................................. G01S 13/9023
See application file for complete search history.

(56) References Cited

U.S. PATENT DOCUMENTS

| | | | | |
|---|---|---|---|---|
| 4,910,520 A * | 3/1990 | Rosen | ..................... | G01S 13/90 342/25 A |
| 5,191,344 A * | 3/1993 | Moreira | .................. | G01S 13/90 342/195 |
| 5,659,318 A * | 8/1997 | Madsen | .............. | G01S 13/9023 342/156 |
| 6,781,541 B1 * | 8/2004 | Cho | ...................... | G01S 13/904 342/25 D |
| 8,212,714 B1 | 7/2012 | Doerry et al. | | |
| 9,074,848 B1 * | 7/2015 | Hunter, Jr. | .............. | G01S 13/90 |

FOREIGN PATENT DOCUMENTS

| | | | |
|---|---|---|---|
| EP | 0716318 A1 * | 6/1996 | ......... G01S 13/9023 |
| WO | 2004/104630 A1 | 12/2004 | |

* cited by examiner

*Primary Examiner* — Bernarr E Gregory
(74) *Attorney, Agent, or Firm* — Baker & Hostetler LLP

(57) ABSTRACT

The SAR is provided formed from a plurality of elementary images issued from successive emission spots, the elementary images overlapping zones of overlap, the measurement of the off-pointing is carried out on the basis of the difference between the energies received from two successive spots in a zone of overlap, the compensation being applied to the antenna reception gain in light of the measurement.

12 Claims, 3 Drawing Sheets

METHOD FOR COMPENSATION OF THE EFFECT OF ANTENNA OFF-POINTING IN AN SAR IMAGE AND RADAR IMPLEMENTING SUCH A METHOD

CROSS-REFERENCE TO RELATED APPLICATIONS

This application claims priority to foreign French patent application No. FR 1700930, filed on Sep. 14, 2017, the disclosure of which is incorporated by reference in its entirety.

FIELD OF THE INVENTION

The present invention relates to a method for compensation of the effect of antenna off-pointing in an SAR image. The invention also relates to a radar implementing such a method.

BACKGROUND

Airborne radars are conventionally used for fire control and imaging in particular. These applications require the installation position of the radar system to be very precisely known and the inertial measurement unit of the carrier to be very high precision.

In particular, various lacks of precision in the positioning of the radar, of the radar boresight, of the radome and the lack of inertial-measurement-unit precision lead to a poor radar-beam pointing direction.

By way of example, antenna pointing bias due to the inertial measurement unit, to the installation position not being very precisely known or to deflection due to the radome is visually perceptible in SAR imaging maps and may lead to fire-control problems. A corrugated-sheet-like ripple effect is then visible in the SAR image and severely hinders comprehension of the image.

One known solution for solving this problem consists in using a very-high-precision inertial measurement unit located as close as possible to the radar. In this solution, the radar must be positioned with the lowest possible tolerances in order to know the position of the radar in the coordinate system of the carrier, an aeroplane for example, as precisely as possible. However, the lower the assembly tolerances, the higher the cost of installation becomes.

Moreover, it is also necessary to use a very-high-precision, very-low-latency inertial measurement unit located as close as possible to the radar as indicated above, this having the effect of further increasing costs. Lastly, there remain residual errors due to the very principle of the measurement unit, which has intrinsic defects.

This solution is therefore costly and does not allow all the biases to be corrected.

SUMMARY OF THE INVENTION

One aim of the invention is in particular to mitigate these drawbacks, by improving the correction of the aforementioned biases, at the lowest possible cost.

To this end, one subject of the invention is a method for compensation of the effect of antenna off-pointing in an Synthetic-Aperture Radar (SAR) image produced by a radar 100, said image being formed from a plurality of elementary images issued from successive emission spots emitted by said radar 100, said elementary images overlapping in what are called zones of overlap, said measurement of the off-pointing $\varepsilon$ being carried out on the basis of the difference between the energies received from two successive spots in a zone of overlap, said compensation being applied to the antenna reception gain in light of said measurement.

In one possible embodiment, said measurement is dependent on the quotient of said energies, said quotient being equal to the square root of the quotient of the average antenna gains in said zone of overlap, said quotient being G2/G1, where:

G1 is the average value of the antenna gain of a spot in said zone of overlap; and G2 is the average value of the antenna gain of the consecutive spot in the zone of overlap.

Said measurement is for example given by the following relationship:

$$\varepsilon = \ln\left(\frac{G2}{G1}\right) * \frac{\theta_{3dB}}{8 * \ln(2) * \Delta\theta_{spot}(1-r)}$$

where:

$\varepsilon$ is said measurement of the off-pointing;

$\theta_{3dB}$ is the angular aperture of the antenna beam at maximum power −3 dB; r is the degree of overlap between the elementary images corresponding to said two consecutive spots; and $\Delta\theta_{spot}$ is the angular width of said spots.

Said compensation, which is dependent on the angle $\theta$ between the antenna beam center and the zone imaged by said SAR image, and which is applied to the antenna gain, is for example given by the following relationship, $G_{correction}(\theta)$ being said compensation:

$$G_{correction}(\theta) = \exp\left[+4 * \ln(2) * \left(\frac{\theta - \varepsilon}{\theta_{3dB}}\right)^2\right]$$

Said measurement is for example carried out according to a given period.

Another subject of the invention is a radar 100 implementing such a method.

BRIEF DESCRIPTION OF THE DRAWINGS

Other features and advantages of the invention will become apparent from the following description, which is given with reference to the appended drawings, which show.

DETAILED DESCRIPTION

Figure 1:
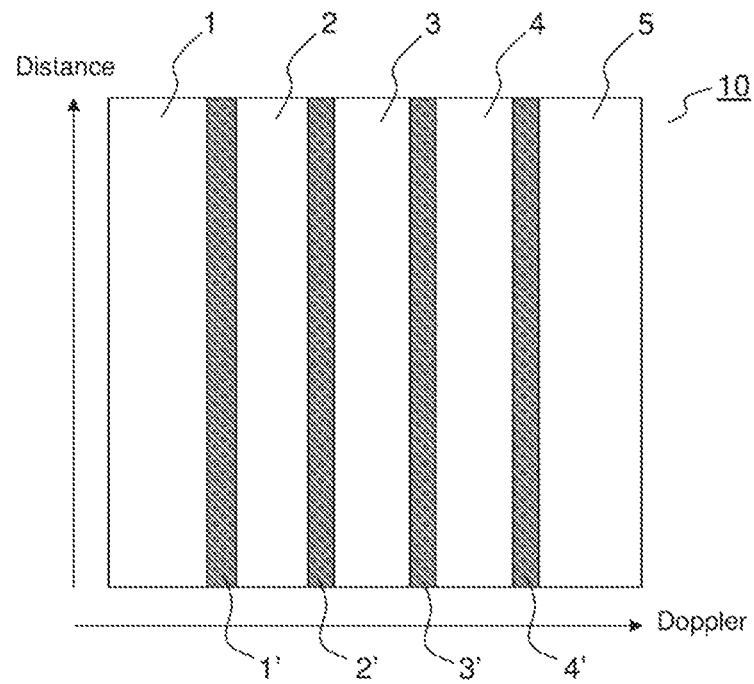
FIG. 1, in the Distance-Doppler plane, an image composed using a plurality of successive spots.

FIG. 1 shows, in the Distance-Doppler plane, an SAR image composed using a plurality of successive spots.

Figure 5:
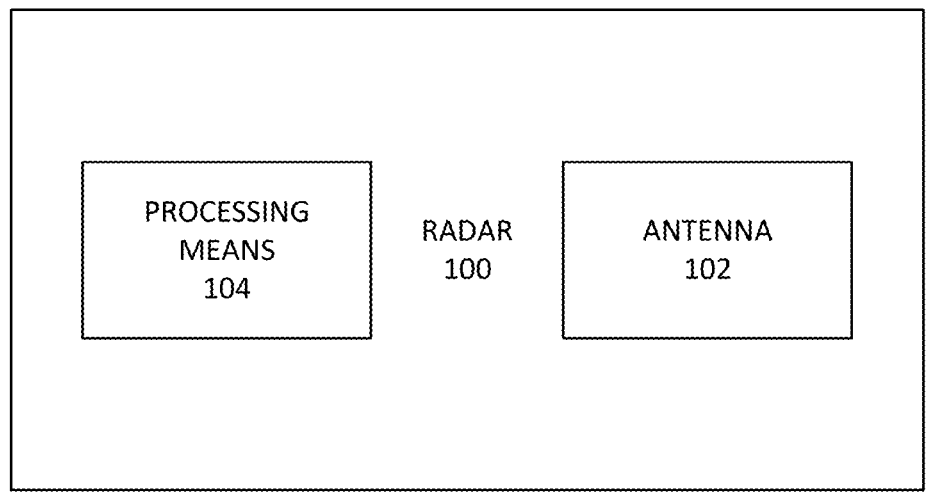
FIG. 5 illustrates a radar.

To produce SAR images of large size, it is necessary to divide the image into a plurality of portions 1, 2, 3, 4, 5 corresponding to successive irradiations, or spots, of the zone to be imaged by the antenna beam of the radar 100 (illustrated in FIG. 5). Small images 1, 2, 3, 4, 5, or elementary images, are thus formed and then juxtaposed to form an image 10 of large size.

This process requires each image to have a portion in common with its adjacent image(s) in order to make the juxtaposition possible, these common portions forming zones of overlap.

FIG. 1 shows an example of an image including five elementary images 1, 2, 3, 4, 5 with four zones of overlap 1', 2', 3', 4'.

Figure 2:
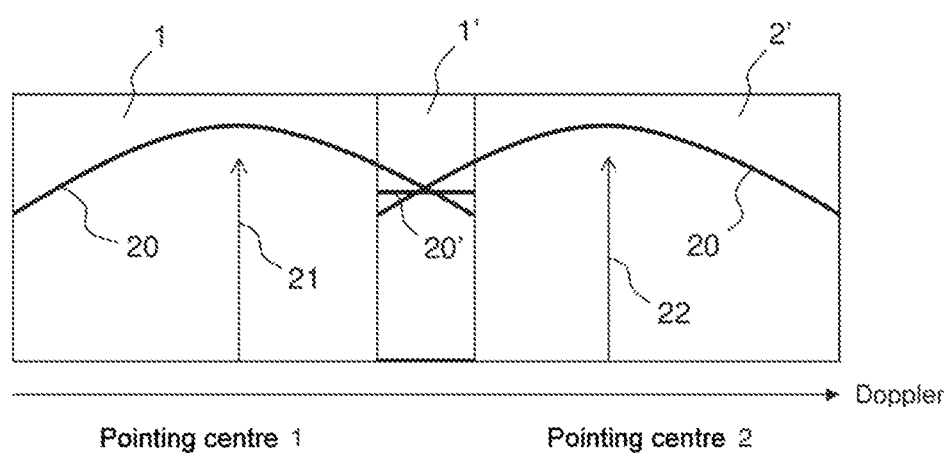
FIG. 2, an illustration of the energy received in two adjacent elementary zones issued from two successive spots without antenna off-pointing.

FIG. 2 illustrates the energy received in two adjacent elementary zones imaged by two adjacent elementary images 1, 2 issued from two successive spots. For these two successive spots, the theoretical antenna gain 20 is obtained by projecting the received energy onto the Doppler axis.

FIG. 2 illustrates the case of perfect pointing control. In this case, it may be seen that the antenna gain is identical for the two pointing directions in the zone of overlap 1'. The average 20' is the same for the two spots.

This result is due to the fact that the antenna gain is perfectly centered on the pointing axis 21, 22 of each spot, and symmetric with respect to this axis.

Given that the imaged zone, in the zone of overlap, is identical from one spot to the next (successive spot), it may be deduced therefrom that the energy received originating from the zone of overlap is almost identical from one spot to the next.

Figure 3:
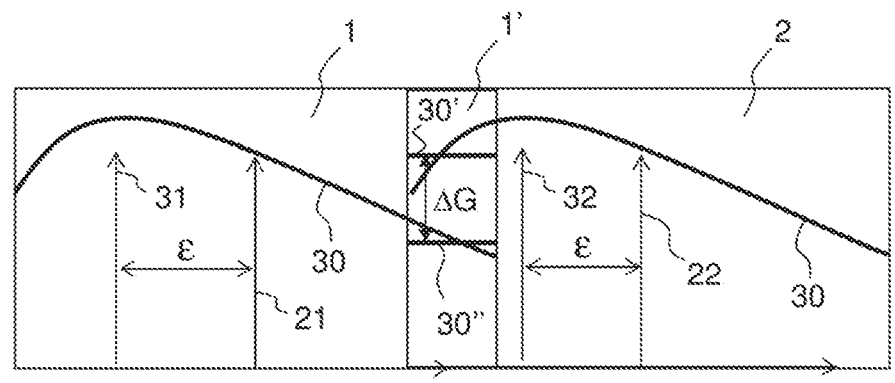
FIG. 3, an illustration of the energy received in two adjacent elementary zones issued from two successive spots in case of antenna off-pointing.

FIG. 3 illustrates a case where the antenna beam has been off-pointed during the acquisition, this off-pointing being due to one of the pointing biases mentioned in the introduction.

As for FIG. 2, FIG. 3 again shows the antenna gain with respect to the Doppler axis, for two successive spots and therefore two adjacent elementary images 1, 2. However, the pointing axis 31, 32 of each of the spots is off-pointed with respect to the axis 21, 22 of the ideal case of FIG. 2.

The antenna gain 30 is no longer symmetric in the spot, this having the consequence that from one spot to the next the antenna gain is different in the zone of overlap 1'. The average 30' of the antenna gain of the spot of portion 2 (right-hand image) is then different from the average 30" of the antenna gain of the spot of portion 3 (left-hand image). The invention advantageously uses the difference in gain $\Delta G$ between these two averages to estimate the off-pointing, and therefore to compensate for it.

To this end, the method according to the invention uses the value of the energy received in a zone of overlap 1' of two adjacent elementary images 1, 2, corresponding to two successive spots. Next, the method calculates, in real time, the off-pointing of the antenna 102 on the basis of these received energies.

Advantageously, it is not necessary to have access to the gain due to the antenna lobe directly. The clever use of the zone of overlap 1' allows this access problem to be overcome by directly using the energy received in the zone of overlap.

Figure 4:
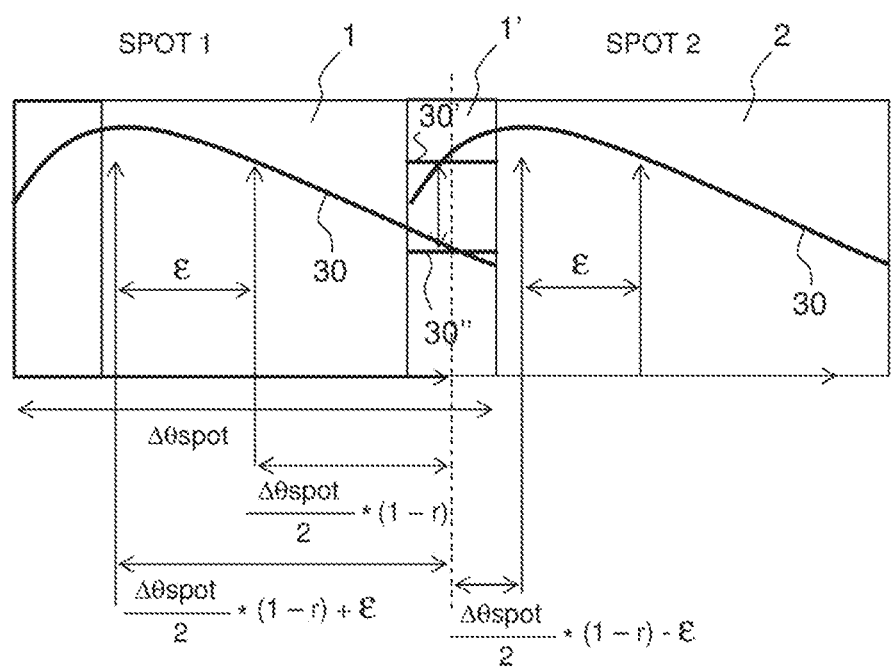
FIG. 4, the illustration of FIG. 3 completed with parameters used in an example of determination of the measurement of the antenna off-pointing.

With reference to FIG. 4, which shows the same elements as FIG. 3, an example of the exploitation of the energy received from two consecutive spots in a zone of overlap of images is illustrated below. More particularly, an example of the calculation of antenna off-pointing on the basis of this received energy is described.

To this end, the following notation will be used $E_{spot11'}$, the energy received in the zone of overlap 1' of the spot generating the elementary image 1, on the left;

$E_{spot21'}$, the energy received in the zone of overlap 1' of the spot generating the elementary image 2, on the right;

SER1', the radar cross section perceived in the zone of overlap, said cross section being the same for the two spots because they both radiate the same zone;

$G_{overlap1}$, the average value of the gain in the zone of overlap 1' for the spot of the left elementary image 1; and $G_{overlap2}$, the average value of the gain in the zone of overlap 1' for the spot of the right elementary image 2.

The ratio of the energies $E_{spot11'}$ and $E_{spot21'}$ received in the zone of overlap being equal to the square of the gain values in this zone, it is possible to write:

$$\frac{E_{spot11'}}{E_{spot21'}} = \frac{RCS1' \cdot G^2_{overlap1}}{RCS1' \cdot G^2_{overlap2}} = \frac{G^2_{overlap1}}{G^2_{overlap2}} \qquad (1)$$

The antenna lobe is modeled in such a way that:

$\theta$ is the angle between the beam center and the imaged zone;

the gain $G(\theta)$ is a monotonically decreasing function of the angle $\theta$ for $\theta > 0$, and $G(\theta) = G(-\theta)$;

$\theta_{3dB}$ is the angular aperture of the beam for a power equal to the maximum power $-3$ dB;

$\varepsilon$ is the sought antenna off-pointing;

r is the degree of overlap between the spots, and more precisely between the corresponding elementary images 1, 2;

$\Delta\theta$spot is the angular width of a spot.

According to this model, if the pointing direction is off-centered by c, as illustrated by FIG. 3, the relationship below is then verified:

$$G(\varepsilon+\theta) = G(\varepsilon-\theta) \qquad (2)$$

However, if a zone of overlap is considered, the angle $\theta$ is then an input parameter of the equation and it becomes possible to calculate the off-pointing E on the basis of the received energy originating from the zone of overlap, using relationship (1).

In relationship (3) below, this principle is applied to an antenna lobe, without off-pointing and with a gain of the form:

$$G(\theta) = \exp\left[-4 * \ln(2) * \left(\frac{\theta}{\theta_{3dB}}\right)^2\right]$$

If the pointing direction is off-centered by c, then according to the following relationship, relationship (4):

$$G(\theta) = \exp\left[-4 * \ln(2) * \left(\frac{\theta - \varepsilon}{\theta_{3dB}}\right)^2\right]$$

Using the quotient $$\frac{E_{spot11'}}{E_{spot21'}}$$

of the energies received in the zone of overlap and more particularly its square root $$\sqrt{\frac{E_{spot11'}}{E_{spot21'}}}$$

the quotient $$\frac{G_{overlap1}}{G_{overlap2}},$$

which is moreover dependent on the off-pointing according to relationship (4) above, is accessed. More particularly, the following relationship, relationship (5), is obtained:

$$\frac{G_{overlap1}}{G_{overlap2}} = \exp\left[-4*\ln(2)*\left[\left(\frac{\frac{\Delta\theta_{spot}(1-r)}{2}+\varepsilon}{\theta_{3dB}}\right)^2 - \left(\frac{\frac{\Delta\theta_{spot}(1-r)}{2}+\varepsilon}{\theta_{3dB}}\right)^2\right]\right]$$

The antenna off-pointing c is deduced therefrom, depending on the energies received from the two successive spots in the zone of overlap and on parameters of the beam that are moreover known, using relationship (6) below:

$$\varepsilon = \ln\left(\frac{G2}{G1}\right) * \frac{\theta_{3dB}}{8*\ln(2)*\Delta\theta_{spot}(1-r)}$$

the following notation being used:
$G1 = G_{overlap1}$, and
$G2 = G_{overlap2}$.

Thus, knowing the value of the off-pointing c, it is possible to calculate the antenna gain to be applied to compensate for the off-pointing by applying above relationship (4). This compensation gain, which is given by relationship (7) below, is noted $G_{correction}(\theta)$.

The antenna gain is therefore corrected by applying the correction gain $G_{correction}(\theta)$ defined by the following relationship, relationship (7):

$$G_{correction}(\theta) = \exp\left[+4*\ln(2)*\left(\frac{\theta-\varepsilon}{\theta_{3dB}}\right)^2\right]$$

This antenna-lobe compensation solution advantageously adapts to the deficiency of the radar 100. This solution remains applicable even if the deficiency changes over time. It is moreover adaptive, and may be applied from radar to radar.

The compensation of antenna off-pointing illustrated above is given by way of example.

The invention advantageously uses the powers received in a zone of image overlap, the powers being issued from two successive spots, and more particularly uses the difference between these powers. The measurement of the off-pointing c is carried out on the basis of this difference. This measurement being known, a plurality of compensation solutions may be implemented to correct the SAR image.

The off-pointing is calculated in real-time throughout an imaging mission. More precisely, it is calculated according to a given period. Each measurement of the off-pointing c is taken into account by the processing means 104, which apply the gain compensation applied to the received signals, depending on the measurement of the off-pointing ε.

The invention claimed is:

1. A method for compensation of an effect of antenna off-pointing in an SAR image produced by a radar, said image being formed from a plurality of elementary images issued from successive emission spots emitted by said radar, said elementary images overlapping in what are called zones of overlap, the method comprising:
   carrying out a measurement of antenna off-pointing ε on a basis of a difference between energies received from two successive spots in a zone of overlap, and
   applying compensation to an antenna reception gain in light of said measurement,
   wherein said measurement being dependent on a quotient of said energies, said quotient being equal to a square root of the quotient of average antenna gains in said zone of overlap, said quotient being G2/G1, where:
   G1 is an average value of the antenna gain of a spot in said zone of overlap; and
   G2 is an average value of the antenna gain of a consecutive spot in the zone of overlap.

2. The method according to claim 1, wherein said measurement is given by the following relationship:

$$\varepsilon = \ln\left(\frac{G2}{G1}\right) * \frac{\theta_{3dB}}{8*\ln(2)*\Delta\theta_{spot}(1-r)}$$

where:
   ε is said measurement of the off-pointing;
   $\theta_{3dB}$ is an angular aperture of an antenna beam at maximum power −3 dB;
   r is a degree of overlap between the elementary images corresponding to said two consecutive spots; and
   $\Delta\theta_{spot}$ is an angular width of said spots.

3. The method according to claim 2, wherein said compensation, which is dependent on an angle θ between an antenna beam center and a zone imaged by said SAR image, and which is applied to the antenna gain, is given by the following relationship, $G_{correction}(\theta)$ being said compensation:

$$G_{correction}(\theta) = \exp\left[+4*\ln(2)*\left(\frac{\theta-\varepsilon}{\theta_{3dB}}\right)^2\right].$$

4. The method according to claim 1, wherein said measurement is carried out according to a given period.

5. A radar system comprising:
   a radar configured to compensate for an effect of antenna off-pointing in an SAR image, said image being formed from a plurality of elementary images issued from successive emission spots emitted by said radar, said elementary images overlapping in zones of overlap,
   the radar configured to carry out a measurement of antenna off-pointing c on a basis of a difference between energies received from two successive spots in a zone of overlap, and
   the radar configured to apply compensation to an antenna reception gain in light of said measurement,
   wherein said measurement being dependent on a quotient of said energies, said quotient being equal to a square root of the quotient of average antenna gains in said zone of overlap, said quotient being G2/G1, where:

G1 is an average value of the antenna gain of a spot in said zone of overlap; and G2 is an average value of the antenna gain of a consecutive spot in the zone of overlap.

6. The radar system according to claim 5, wherein said measurement is given by the following relationship:

$$\varepsilon = \ln\left(\frac{G2}{G1}\right) * \frac{\theta_{3dB}}{8*\ln(2)*\Delta\theta_{spot}(1-r)}$$

where:

ε is said measurement of the off-pointing;

$\theta_{3dB}$ is an angular aperture of an antenna beam at maximum power −3 dB;

r is a degree of overlap between the elementary images corresponding to said two consecutive spots; and Δθspot is an angular width of said spots.

7. The radar system according to claim 6, wherein said compensation, which is dependent on an angle θ between an antenna beam center and a zone imaged by said SAR image, and which is applied to the antenna gain, is given by the following relationship, $G_{correction}(\theta)$ being said compensation:

$$G_{correction}(\theta) = \exp\left[+4*\ln(2)*\left(\frac{\theta-\varepsilon}{\theta_{3dB}}\right)^2\right].$$

8. The radar system according to claim 5, wherein said measurement is carried out according to a given period.

9. A method for compensation of an effect of antenna off-pointing in an SAR image produced by a radar, said image being formed from a plurality of elementary images issued from successive emission spots emitted by said radar, said elementary images overlapping in zones of overlap, the method comprising:

carrying out a measurement of antenna off-pointing ε with a radar processing device on a basis of a difference between energies received from two successive spots in a zone of overlap, and applying compensation with the radar processing device to an antenna reception gain in light of said measurement, wherein said measurement being dependent on a quotient of said energies, said quotient being equal to a square root of the quotient of average antenna gains in said zone of overlap, said quotient being G2/G1, where:

G1 is an average value of the antenna gain of a spot in said zone of overlap; and G2 is an average value of the antenna gain of a consecutive spot in the zone of overlap.

10. The method according to claim 9, wherein said measurement is given by the following relationship:

$$\varepsilon = \ln\left(\frac{G2}{G1}\right) * \frac{\theta_{3dB}}{8*\ln(2)*\Delta\theta_{spot}(1-r)}$$

where:

ε is said measurement of the off-pointing;

$\theta_{3dB}$ is an angular aperture of an antenna beam at maximum power −3 dB;

r is a degree of overlap between the elementary images corresponding to said two consecutive spots; and Δθspot is an angular width of said spots.

11. The method according to claim 10, wherein said compensation, which is dependent on an angle θ between an antenna beam center and a zone imaged by said SAR image, and which is applied to the antenna gain, is given by the following relationship, $G_{correction}(\theta)$ being said compensation:

$$G_{correction}(\theta) = \exp\left[+4*\ln(2)*\left(\frac{\theta-\varepsilon}{\theta_{3dB}}\right)^2\right].$$

12. The method according to claim 9, wherein said measurement is carried out according to a given period.

* * * * *

UNITED STATES PATENT AND TRADEMARK OFFICE
CERTIFICATE OF CORRECTION

PATENT NO. : 10,802,137 B2
APPLICATION NO. : 16/125728
DATED : October 13, 2020
INVENTOR(S) : Aymeric Deville et al.

Page 1 of 1

It is certified that error appears in the above-identified patent and that said Letters Patent is hereby corrected as shown below:

In the Claims

In Claim 5, Column 6, Line 61, "antenna off-pointing c on a basis" should be -- antenna off-pointing ε on a basis --.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*